United States Patent
Wang et al.

(10) Patent No.: US 8,218,859 B2
(45) Date of Patent: Jul. 10, 2012

(54) TRANSDUCTIVE MULTI-LABEL LEARNING FOR VIDEO CONCEPT DETECTION

(75) Inventors: Jingdong Wang, Beijing (CN); Shipeng Li, Redmond, WA (US); Xian-Sheng Hua, Beijing (CN); Yinghai Zhao, Hefei Anhui (CN)

(73) Assignee: Microsoft Corporation, Redmond, WA (US)

( * ) Notice: Subject to any disclaimer, the term of this patent is extended or adjusted under 35 U.S.C. 154(b) by 873 days.

(21) Appl. No.: 12/329,293

(22) Filed: Dec. 5, 2008

(65) Prior Publication Data
US 2010/0142803 A1 Jun. 10, 2010

(51) Int. Cl.
*G06K 9/62* (2006.01)
*G06K 9/00* (2006.01)
(52) U.S. Cl. ...................................................... 382/160
(58) Field of Classification Search .......... 382/159–161, 382/186, 187, 190, 203, 209, 218–220, 224, 382/228; 375/240.08, 340; 704/200, 223, 704/246, 255, 256.4; 715/723; 348/231.2, 348/699, 722; 703/2; 345/419, 427, 656
See application file for complete search history.

(56) References Cited

U.S. PATENT DOCUMENTS

| | | | | |
|---|---|---|---|---|
| 5,289,562 A | * | 2/1994 | Mizuta et al. | 704/200 |
| 5,544,257 A | * | 8/1996 | Bellegarda et al. | 382/187 |
| 5,594,809 A | * | 1/1997 | Kopec et al. | 382/161 |
| 5,710,866 A | * | 1/1998 | Alleva et al. | 704/256.4 |
| 6,112,021 A | * | 8/2000 | Brand | 703/2 |
| 6,219,642 B1 | * | 4/2001 | Asghar et al. | 704/256.8 |
| 6,751,354 B2 | | 6/2004 | Foote et al. | |
| 6,754,389 B1 | | 6/2004 | Dimitrova et al. | |
| 6,763,069 B1 | | 7/2004 | Divakaran et al. | |
| 6,832,190 B1 | * | 12/2004 | Junkawitsch et al. | 704/255 |
| 2005/0125223 A1 | | 6/2005 | Divakaran et al. | |
| 2006/0274860 A1 | * | 12/2006 | Vithanage et al. | 375/340 |
| 2007/0101269 A1 | | 5/2007 | Hua et al. | |
| 2010/0142803 A1 | * | 6/2010 | Wang et al. | 382/160 |

OTHER PUBLICATIONS

Altun, et al., "Maximum Margin Semi-Supervised Learning for Structured Variables", retrieved on Oct. 23, 2008 at <<http://nagoya.uchicago.edu/~dmcallester/nips2005.pdf>>, Advances in Neural Information Processing Systems (NIPS), 2005, pp. 1-8.

Belkin, et al., "Manifold Regularization: A Geometric Framework for Learning from Labeled and Unlabeled Examples", retrieved on Oct. 23, 2008 at <<http://delivery.acm.org/10.1145/1250000/1248632/7-2399-belkin.pdf?key1=1248632&key2=7398574221&coll=GUIDE&dl=GUIDE&CFID=7698825&CFTOKEN=66208580>>, Journal of Machine Learning Research, vol. 7, 2006, pp. 2399-2434.

Bennett, et al., "Semi-Supervised Support Vector Machines", retrieved on Oct. 23, 2008 at <<http://www1.cs.columbia.edu/~dplewis/candidacy/bennett98semisupervised.pdf>>, MIT Press: Advances in Neural Information Processing Systems (NIPS'98), 1999, pp. 368-374.

(Continued)

*Primary Examiner* — Amir Alavi
(74) *Attorney, Agent, or Firm* — Lee & Hayes, PLLC (57) ABSTRACT

This disclosure describes various exemplary method and computer program products for transductive multi-label classification in detecting video concepts for information retrieval. This disclosure describes utilizing a hidden Markov random field formulation to detect labels for concepts in a video content and modeling a multi-label interdependence between the labels by a pairwise Markov random field. The process groups the labels into several parts to speed up a labeling inference and calculates a conditional probability score for the labels, the conditional probability scores are ordered for ranking in a video retrieval evaluation.

20 Claims, 6 Drawing Sheets

OTHER PUBLICATIONS

Boykov, et al., "An Experimental Comparison of Min-Cut/Max-Flow Algorithms for Energy Minimization in Vision", retrieved on Oct. 23, 2008 at <<http://www.csd.uwo.ca/~yuri/Papers/pami04.pdf>>, IEEE Transactions on Pattern Analysis and Machine Intelligence (PAMI), vol. 26, No. 9, 2004, pp. 1124-1137.

Brefeld, et al., "Semi-Supervised Learning for Structured Output Variables", retrieved on Oct. 23, 2008 at <<http://www2.informatik.hu-berlin.de/~brefeld/publications/icml06.ps>>, ACM ICML, 2006, pp. 145-152.

Chen, et al., "Semi-Supervised Multi-Label Learning by Solving a Sylvester Equation", retrieved on Oct. 23, 2008 at <<http://www.siam.org/proceedings/datamining/2008/dm08_37_chen.pdf>>, SIAM: Conference on Data Mining, 2008, pp. 410-419.

Duh, et al, "Structured Multi-label Transductive Learning: A Case Study in Lexicon Acquisition", retrieved on Apr. 23, 2009 at <<http://citeseerx.ist.psu.edu/viewdoc/summary;jsessionid=F4AEFE3875605F3305B76972325D2E57?doi=10.1.1.80.6055>>, in NIPS Workshop in Advances in Structured Learning for Text/Speech Processing, 2005b., 4 pgs.

Frey, et al., "A Comparison of Algorithms for Inference and Learning in Probabilistic Graphical Models", retrieved on Oct. 23, 2008 at <<http://www.cs.ubc.ca/~murphyk/Teaching/CS532c_Fall04/Papers/freyJojicTutorial.pdf>>, University of Toronto Technical Report 2003, and IEEE Transactions on Pattern Analysis and Machine Intelligence, vol. 27, No. 9, 2005, pp. 1392-1416.

He, et al., "Manifold-Ranking Based Image Retrieval", retrieved on Oct. 23, 2008 at <<http://www.au.tsinghua.edu.cn/szll/bodao/zhangchangshui/english/paper/ACM04_hjr.pdf>>, ACM MM'04 (1-58113-893-08/04/0010), 2004, pp. 9-16.

Jiang, et al., "Active Context-based Concept Fusion with Partial User Labels", retrieved on Oct. 23, 2008 at <<http://www.ee.columbia.edu/In/dvmm/publications/06/wei_icip06.pdf>>, IEEE Conference on Image Processing, 2006, pp. 2917-2920.

Joachims, "Transductive Inference for Text Classification using Support Vector Machines", retrieved on Oct. 23, 2008 at <<http://citeseerx.ist.psu.edu/viewdoc/download?doi=10.1.1.47.9736&rep=rep1&type=pdf>>, Morgan Kaufmann Publishers Inc.: ICML, 1999, pp. 200-209.

Kolmogorov, "Convergent Tree-Reweighted Message Passing for Energy Minimization", retrieved on Oct. 23, 2008 at <<http://www.adastral.ucl.ac.uk/~vladkolm/papers/TRW-S-PAMI.pdf>>, IEEE Transactions on Pattern Analysis and Machine Intelligence (PAMI), vol. 28, No. 10, 2006, pp. 1568-1583.

Lee, et al., "Learning to Model Spatial Dependency: Semi-Supervised Discriminative Random Fields", retrieved on.Oct. 23, 2008 at <<http://books.nips.cc/papers/files/nips19/NIPS2006_0629.pdf>>, Advances in Neural Information Processing Systems (NIPS'06): Neural Information Processing Systems, vol. 19, 2007, pp. 793-800.

Liu, et al., "Semi-supervised Multi-label Learning by Constrained Non-negative Matrix Factorization", retrieved on Apr.23, 2009 at <<http://www.cse.msu.edu/~liuyi3/publications/liu-06-semi-supervised.pdf>>, Copyright 2006, American Association for Artificial Intelligence (www.aaai.org), 2006, 6 pgs.

Naphade, et al., "A Light Scale Concept Ontology for Multimedia Understanding for TRECVID 2005", retrieved on.Oct. 23, 2008 at <<http://www-nlpir.nist.gov/projects/tv2005/LSCOMlite_NKKCSOH.pdf>>, IBM Research Technical Report, RC23612 (W0505-104), 2005, pp. 1-4.

Ng, et al., "On Spectral Clustering: Analysis and an Algorithm", retrieved on Oct. 23, 2008 at <<http://citeseerx.ist.psu.edu/viewdoc/download;jsessionid=6C7EA3F25E095CEBA24EAF2F115BD006?doi=10.1.1.19.8100&rep=rep1&type=pdf>>, MIT Press, Advances in Neural Information Processing Systems, vol. 14, 2001, pp. 849-856.

Qi, et al., "Correlative Multi-Label Video Annotation", retrieved on Oct. 23, 2008 at <<http://delivery.acm.org/10.1145/1300000/1291245/p17-qi.pdf?key1=1291245&key2=7575484221&coll=GUIDE&dl=GUIDE&CFID=7854393&CFTOKEN=33432095>>, ACM MM'07 (978-1-59593-701-08/07/0009), ACM Conference on Multimedia, 2007, pp. 17-26.

Smeaton, et al., "TREC Video Retrieval Evaluation Conference" and "TRECVID2005 Guidelines", retrieved on Oct. 24, 2008 at <<http://www-nlpir.nist.gov/projects/trecvid/>>, NIST, 2005, 17 pgs.

Song, et al., "Semi-Automatic Video Annotation based on Active Learning with Multiple Complementary Predictors",retrieved on Oct. 23, 2008 at <<http://delivery.acm.org/10.1145/1110000/1101844/p97-song.pdf?key1=1101844&key2=3785484221&coll=GUIDE&dl=GUIDE&CFID=7854560&CFTOKEN=33116688>>, ACM SIGM MIR'05 (1-59593-244-5/05/0011), 2005, pp. 97-104.

Strehl, et al., "Cluster Ensembles—A Knowledge Reuse Framework for Combining Multiple Partitions", retrieved on Oct. 23, 2008 at <<http://jmlr.csail.mit.edu/papers/volume3/strehl02a/strehl02a.pdf>>, Journal of Machine Learning Research, vol. 3, 2002, pp. 583-617.

Tang, et al., "Optimizing Training Set Construction for Video Semantic Classification", retrieved on Oct. 23, 2008 at <<http://hindawi.com/GetPDF.aspx?doi=10.1155/2008/693731>>, Hindawi Publishing Corporation: EURASIP Journal on Advances in Signal Processing, vol. 2008, No. 693731, pp. 1-10.

Tang, et al., "Structure-Sensitive Manifold Ranking for Video Concept Detection", retrieved on Oct. 23, 2008 at <<http://research.microsoft.com/users/xshua/publications/pdf/2007_ACMMM_SSAniMR.pdf>>, ACM MM'07 (978-1-59593-701-8/07/0009), 2007, pp. 852-861.

Tang, et al., "Video Annotation based on Temporally Consistent Gaussian Random Field", retrieved on Oct. 23, 2008 at <<http://ieeexplore.ieee.org/stamp/stamp.jsp?arnumber=4155592&isnumber=4155578>>, Electronics Letters, vol. 43, No. 8, 2007, pp. 448-449.

Wang, et al., "Automatic Video Annotation by Semi-Supervised Learning with Kernel Density Estimation", retrieved on Oct. 23, 2008 at <<http://delivery.acm.org/10.1145/1190000/1180855/p967-wang.pdf?key1=1180855&key2=9150674221&coll=GUIDE&dl=GUIDE&CFID=7483400&CFTOKEN=27770365>>, ACM MM'06 (1-59593-447-2/06/0010), 2006, pp. 967-976.

Wang, et al. "Transductive Multi-Label Learning for Video Concept Detection", Oct. 2008, 10 pgs.

Wang, et al., "Image Annotation Refinement using Random Walk with Restarts", retrieved on Oct. 23, 2008 at <<http://delivery.acm.org/10.1145/1190000/1180774/p647-wang.pdf?key1=1180774&key2=5356484221&coll=GUIDE&dl=GUIDE&CFID=7855622&CFTOKEN=57509861>>, ACM MM'06 (1-59593-447-2/06/0010), 2006, pp. 647-650.

Wang, et al., "Optimizing Multi-Graph Learning: Towards a Unified Video Annotation Scheme", retrieved on Oct. 23, 2008 at <<http://research.microsoft.com/~xshua/publications/pdf/2007_ACMMM_OMGSSL.pdf>>, ACM MM'07 (978-1-59593-701-8/07/0009), 2007, pp. 862-871.

Yan, et al., "Mining Relationship between Video Concepts using Probabilistic Graphical Models", retrieved on Oct. 23, 2008 at <<http://citeseerx.ist.psu.edu/viewdoc/download?doi=10.1.1.72.4347&rep=rep1&type=pdf>>, IEEE Conference on Multimedia, 2006, pp. 301-304.

Yan, et al., "Semi-Supervised Cross Feature Learning for Semantic Concept Detection in Videos", retrieved on Oct. 30, 2008 at <<http://ieeexplore.ieee.org/stamp/stamp.jsp?arnumber=1467331&isnumber=31472>>, IEEE Computer Society CVPR'05 (1063-6919/05), vol. 1, 2005, pp. 657-663.

Yanagawa, et al., "Columbia University's Baseline Detectors for 374 LSCOM Semantic Visual Concepts", retrieved on Oct. 23, 2008 at <<http://www.ee.columbia.edu/~lyndon/pubs/adventtr2007-columbia374.pdf>>, Technical Report 222-2006-8, 2007, pp. 1-17.

Yuan, et al., "Manifold-Ranking based Video Concept Detection on Large Database and Feature Pool", retrieved on Oct. 23, 2008 at <<http://delivery.acm.org/10.1145/1190000/1180768/p623-yuan.pdf?key1=1180768&key2=7907484221&coll=GUIDE&dl=GUIDE&CFID=7629263&CFTOKEN=29025827>>, ACM MM'06 (1-59593-447-2/06/0010), 2006, pp. 623-625.

Zha, et al., "Graph-based Semi-Supervised Learning with Multi-Label", retrieved on Oct. 23, 2008 at <<http://ieeexplore.ieee.org/stamp/stamp.jsp?arnumber=4607686&isnumber=4607348>>, IEEE ICME (978-1-4244-2571-6/08), 2008, pp. 1321-1324.

Zhang, et al., "ML-KNN: A Lazy Learning Approach to Multi-Label Learning", retrieved on Oct. 23, 2008 at <<http://cs.nju.edu.cn/zhouzh/zhouzh.files/publication/pr07.pdf>>, Elsevier Science Inc.: Pattern Recognition, vol. 40, No. 7, 2007, pp. 2038-2048.

Zhou, et al., "Learning with Local and Global Consistency", retrieved on Oct. 23, 2008 at <<http://citeseerx.ist.psu.edu/viewdoc/download?doi=10.1.1.9.3480&rep=rep1&type=pdf>>, MPI Technical Report: Advances in Neural Information Processing Systems (NIPS'03), vol. 16, 2004, pp. 321-328.

Zhu, "Semi-Supervised Learning Literature Survey", retrieved on Oct. 23, 2008 at <<http://pages.cs.wisc.edu/~jerryzhu/pub/ssl_survey.pdf>>, University of Wisconsin-Madison Tech Report 1530, 2005, pp. 1-60.

Zhu, et al., "Semi-Supervised Learning using Gaussian Fields and Harmonic Functions", retrieved on Oct. 23, 2008 at <<http://learning.eng.cam.ac.uk/zoubin/papers/zgl.pdf>>, ICML, vol. 20, No. 2, 2003, pp. 912-919.

Zien, et al., "Transductive Support Vector Machines for Structured Variables", retrieved on Oct. 23, 2008 at <<http://delivery.acm.org/10.1145/1280000/1273645/p1183-zien.pdf?key1=1273645&key2=7347484221&coll=GUIDE&dl=GUIDE&CFID=7857141&CFtoken=20813995>>, ACM ICML, 2007, pp. 1183-1190.

* cited by examiner

TRANSDUCTIVE MULTI-LABEL LEARNING FOR VIDEO CONCEPT DETECTION

TECHNICAL FIELD

The subject matter relates generally to video content, and more specifically, to detecting concepts in videos using visual information.

BACKGROUND

Digital video content has grown rapidly which becomes more of a challenge in managing a large number of videos. One way to manage the large number of videos is to associate a video with semantic key-words to describe a semantic content. This type of association presents challenges for video annotation or video concept detection, which has attracted more and more attention recently. In particular, the challenges are to build a relationship between low-level features and semantic-level concepts and to bridge a gap between the two levels.

Another problem with the large amount of videos is relying on manual annotation, which is very impractical. This is impractical as manual annotation is labor intensive, costly, and requires an extraordinary amount of time. Therefore, alternatives are to pursue an effective automatic video annotation.

Various attempts have been made to classify videos. Techniques that have tried, include semi-supervised classification approaches to video annotation. The semi-supervised classification approaches can handle the insufficiency issue of the labeled videos. In practice, a video is usually associated with more than one concept. For example, a video with a "mountain" scene is also annotated as an "outdoor" concept. This poses a multi-label classification problem, in which a data point may be associated with more than one label. Some single-label approaches have been directly applied to multi-label video annotation. However, these approaches use the single-label method, which only processes each label individually and transforms the label into several independent single-label classification problems. Thus, this approach does not address the multi-label problem.

Therefore, it is desirable to find ways to detect concepts for videos by using a transductive multi-label classification.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary methods and computer program products for detecting concepts in videos, as part of information retrieval. The detection includes a transductive multi-label classification approach using a hidden Markov random field formulation to identify labels for concepts in a video content. A multi-label interdependence is modeled between the labels by a pairwise Markov random field and the labels are grouped into several parts to speed up a labeling inference. Next, a conditional probability score is calculated for the labels, where the scores are ordered for ranking in a video retrieval evaluation. Thus, this disclosure identifies concepts for videos by using a transductive multi-label classification approach, which models labeling consistency between visually similar videos and interdependence between multiple labels. As a result, this concept detection approach makes it more convenient to manage multi-labels for videos.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to various exemplary methods and computer program products for transductive multi-label classification for video concept detection. There exist video retrieval techniques that are proposed to handle the insufficiency of labeled videos. However, previous concept detection techniques typically focused on single-label approaches, without leveraging multi-labeled video data and are not concerned with multi-label interdependence for each video. Thus, the transductive multi-label classification described herein allows users to search for video concepts by leveraging both labeled and unlabeled videos and incorporating multi-label interdependence in the process to detect concepts.

In one aspect, the video concept detection process uses transductive multi-label classification with a hidden Markov random field formulation to identify labels for concepts in a video content and to model a multi-label interdependence between the labels by a pairwise Markov random field. Furthermore, the process groups the labels into several parts to speed up a labeling inference and calculates a conditional probability score for the labels for ranking in a video retrieval evaluation.

In another aspect, the process detects concepts in videos using a transductive multi-label classification. The process finds labels that are similar as a pre-given labeling on labeled data points, ensures the labeling is consistent between neighboring points, and identifies whether a multi-label interdependence on unlabeled data points is similar to a multi-label interdependence on labeled data points. Then the process retrieves the video based on an ordered score of the multi-label classification.

In yet another aspect, the method includes constructing a graph to represent the transductive multi-label classification.

The classification approach includes constructing a set of hidden nodes to represent binary-valued labels corresponding to associated concepts and constructing a set of observable nodes to represent pre-given binary-valued labels over labeled data points. The graph has a first set of edges, observable edges to connect the set of hidden nodes to the set of observable nodes, and second set of edges to connect the hidden nodes, if the corresponding data points are neighboring data points. Finally, there are a third set of edges to connect a pair of nodes that correspond to the same data point.

The described transductive multi-label classification method improves efficiency and convenience to the user during video concept detection, as part of information retrieval. Furthermore, the transductive multi-label classification method described maximizes relationships among the label pairs. By way of example and not limitation, the transductive multi-label classification method described herein may be applied to many contexts and environments. By way of example and not limitation, the transductive multi-label classification method may be implemented to support information retrieval for video concept detection by searching videos on web searching, search engines, enterprise networks, content websites, content blogs, multimedia, and the like.

Illustrative Environment

Figure 1:
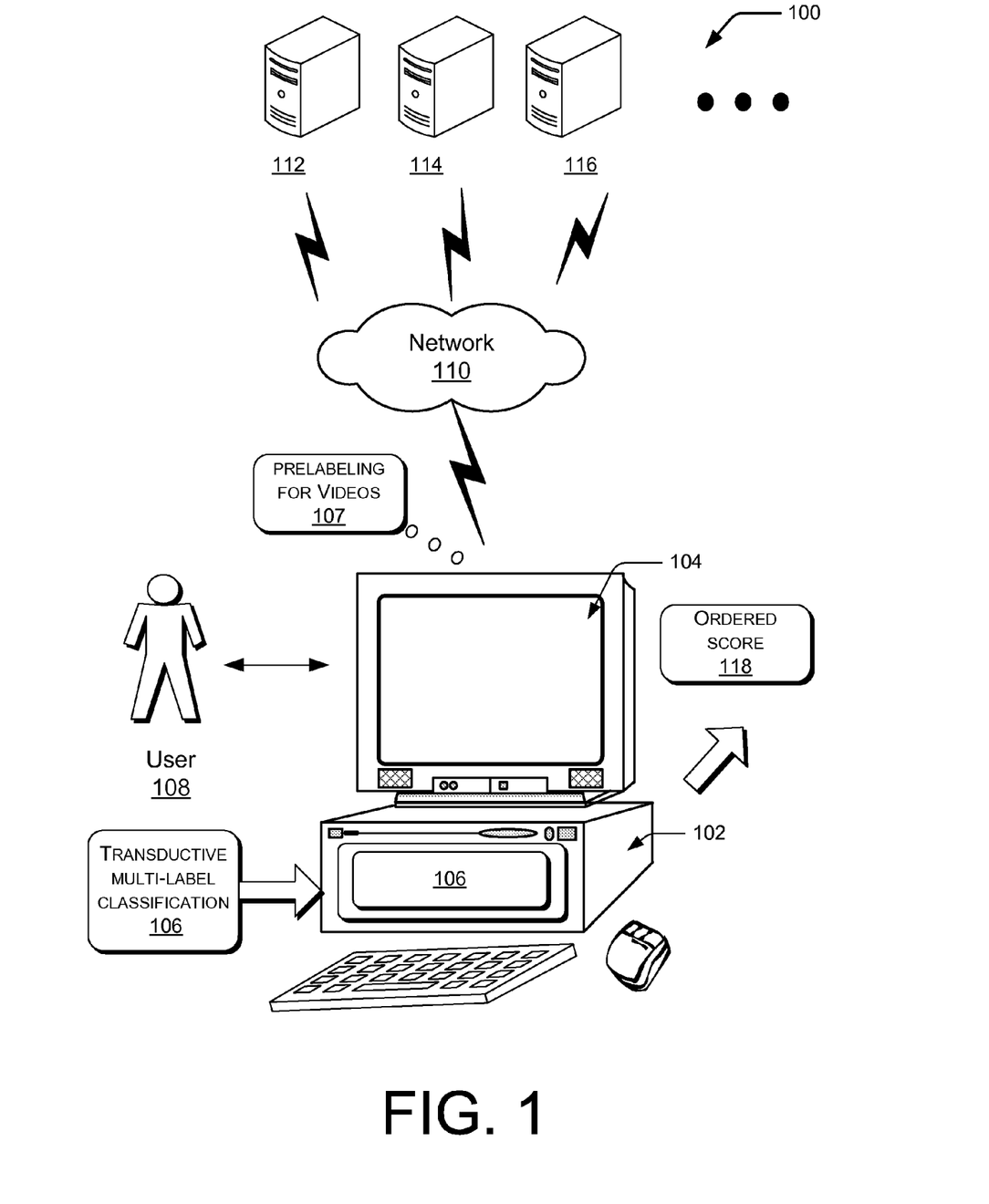
FIG. 1 is a block diagram of an exemplary system for detecting concepts in videos using a transductive multi-label classification approach.

FIG. 1 is an overview block diagram of an exemplary system 100 for transductive multi-label classification in video concept detection. Shown is a computing device 102. Computing devices 102 that are suitable for use with the system 100, include, but are not limited to, a personal computer, a laptop computer, a desktop computer, a workstation computer, a personal digital assistance, a cellular phone, a smart phone, and the like. The computing device 102 may include a monitor 104 to display results for the transductive multi-label classification in video concept detection, as part of information retrieval.

The system 100 may include transductive multi-label classification as, for example, but not limited to, a tool, a method, a solver, software, an application program, a service, technology resources which include access to the internet, part of a web browser, and the like. Here, the transductive multi-label classification is implemented as an application program 106. In an implementation, transductive multi-label classification is provided as a service.

The transductive multi-label classification application program 106 makes it more convenient for a user 108 in searching for video concepts. Traditional transductive techniques for video annotation only address the single-label case. When in reality, a video is usually associated with more than one concept. For example, a video with a "mountain" scene is also annotated as an "outdoor" concept. This has been a problem for multi-label classification in which a data point may be associated with more than one label. Some single-label approaches have been tried towards multi-label video annotation. These approaches process each label individually and then transform the classification into several independent single-label classification problems, without consideration of multi-labels.

In an implementation, the input for the transductive multi-label classification application program 106 is a set of videos. Some of the videos may include labels for a small portion of the videos. In particular, the label corresponds to pre-labeling shown as block 107, which is usually conducted by users.

Implementation of the transductive multi-label classification application program 106 includes, but is not limited to, video concept detection by searching videos or web searching on the internet 110, using search engines 112, enterprise networks 114, content websites 116, content blogs, and the like. After the videos are processed through the transductive multi-label classification application program 106, going through a process with multiple steps, an ordered score for the labels based on the probability scores for video concept detection, is shown in 118.

As shown here, the transductive multi-label classification application program 106 makes use of a conditional probability score for the labels, where the conditional probability scores are ordered for ranking 118 in video retrieval evaluation. The transductive multi-label classification application program 106 assigns a probability score for each of the labels and defines a similarity score between the labels, where the similarity is a correlation between the ranking results of two labels. The transductive multi-label classification application program 106 directly infers the labeling through an optimization algorithm without the necessity to estimate the intermediate inductive decision function.

Thus, the transductive multi-label classification application program 106 evaluates multi-labels from videos for concept detection and returns relevant ordered score results 118.

Illustrative Overview Process

Figure 2:
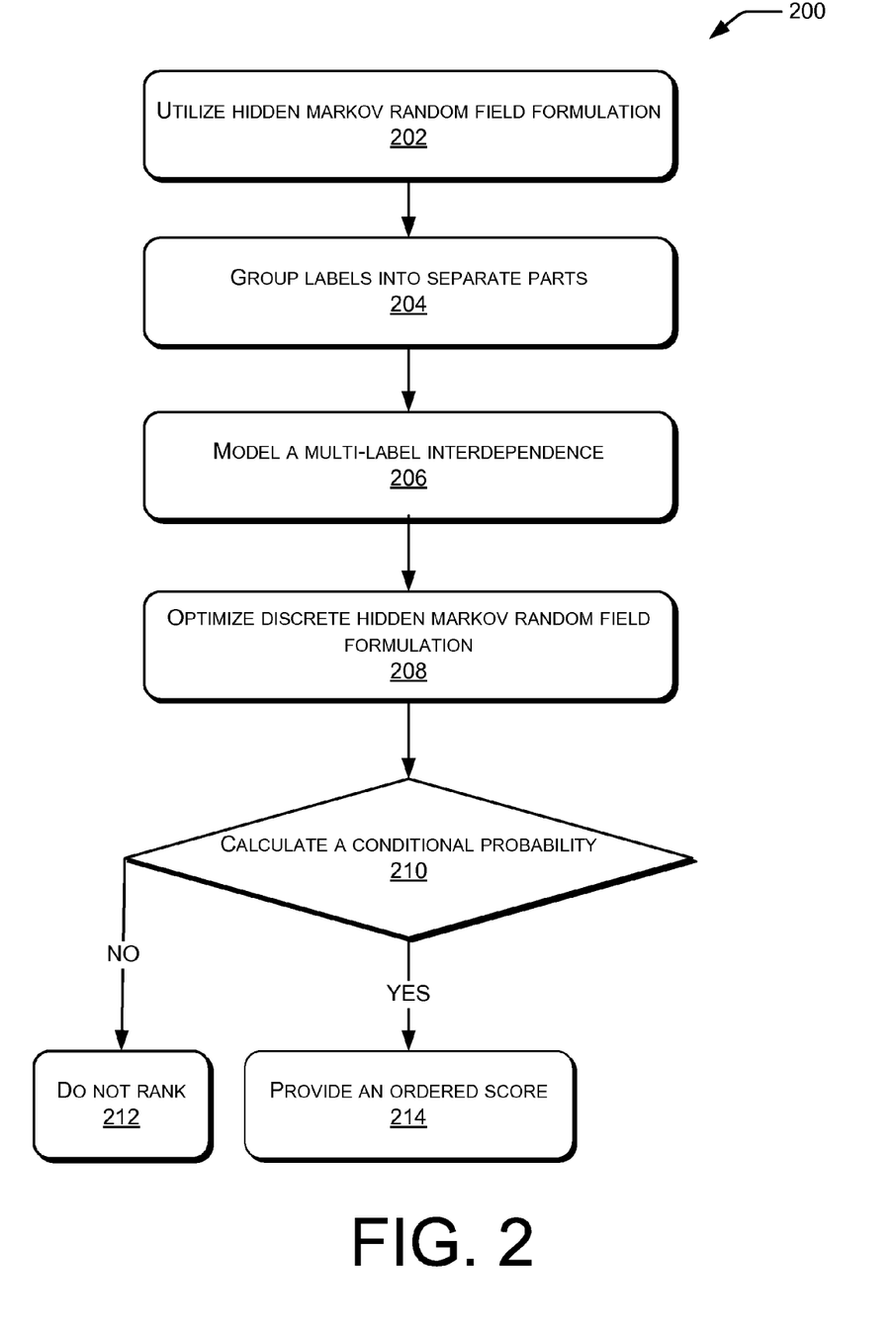
FIG. 2 is an overview flowchart showing an exemplary process for detecting concepts in videos using the transductive multi-label approach of FIG. 1.

Illustrated in FIG. 2 is an overview exemplary flowchart of a process 200 for implementing the transductive multi-label classification application program 106 to provide a benefit to users in managing videos. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 200 provides an exemplary implementation of the transductive multi-label classification application program 106 of FIG. 1. Starting at block 202, represents utilizing a discrete hidden Markov random field formulation for implementing transductive multi-label classification application program 106. The discrete hidden Markov random field formulation identifies labels for concepts in a video content. This approach is to identify a labeling that satisfies several properties for classification. A detailed discussion for identifying labels for transductive multi-classification follows in FIG. 3.

Block 204 represents grouping the multi-labels into several parts or chunklets to further speed up the labeling inference. The labels can be divided to several categories such that the labels from different categories have smaller interdependence and the labels in the same category have larger inter-dependence. For example, in a data set, labels for "bus" and "car" have strong mutual-dependence, but these terms have less dependence with "weather". Therefore, the labels are categorized into several subsets, called label chunklets, which factorize the multi-label interdependence. This is performed before and for multi-label interdependence. A detailed discussion for chunklet analysis for transductive multi-classification follows in FIG. 5.

Block 206 represents modeling a multi-label interdependence. The Markov random field formulation simultaneously models the labeling consistency between visually similar videos and the multi-label interdependence for each video in an integrated framework. The multi-label interdependence is formulated as a pairwise Markov random field model 206, in which all the combinations of relationships between pairs of labels include, but is not limited to, a positive-positive relationship, a positive-negative relationship, a negative-positive relationship, and a negative-negative relationship are explored. The combinations of pairwise relationships over multiple labels are seamlessly modeled.

Block 208 represents an optimization for the discrete hidden Markov random field. In this implementation, a tree-reweighted message passing and graph cuts are combined to infer the labels efficiently. An iterative statistical inference algorithm assures that a near-optimal solution is obtained. The speed depends on the initialization. Therefore, a second algorithm is adopted to provide a good initialization, a warm start, to speed up the inference. Graph cuts are assured to obtain a global optimal solution when the pairwise energy function is submodular. For example, equation $e_{ij,c}(0,0)+e_{ij,c}(1,1) \leq e_{ij,c}(0,1)+e_{ij,c}(1,0)$ means $e_{ij,c}$ is submodular. In this case, the label-pair-wise energy is not assured to satisfy this submodular property. Therefore, the process discards the non-submodular energies and performs the graph cuts algorithm to obtain a solution, which is used as the warm start. The solution to the proposed transductive multi-label classification is found as the joint maximum, shown as: $Y^* = \arg\max_Y \Pr(Y)$.

This process is very efficient for two reasons. First, this approach is a transductive approach and avoids estimating an intermediate decision function. Second, this approach adopts the efficient graph cuts and tree-reweighted message passing algorithms for labeling inference.

Block 210 represents calculating the probabilities for the process. In particular the probability calculation combines 1) a probability between the two variables to describe their compatibility, 2) an aggregated probability that the labeling is consistent between data points with similar features, and 3) the probability of the pairwise interdependence between the multiple labels. The probabilities are aggregated into a single probability, shown in equation as:

$$Pr(Y) = \frac{1}{Z} Pr_o(Y_l) Pr_s^\lambda(Y) Pr_d^{1-\lambda}(Y_u) = \frac{1}{Z} \prod_{i \in \mathcal{L}, c \in C} Pr(\mathbf{y}_{ic}) \prod_{c \in C, (i,j) \in \varepsilon_g^c} \psi^\lambda(\mathbf{y}_{ic}, \mathbf{y}_{jc}) \prod_{i \in U, \alpha, \beta \in c} \phi^{1-\lambda}(\mathbf{y}_{i\alpha}, \mathbf{y}_{i\beta})$$

where λ is a trade-off variable to control a balance between the sample-pair-wise and label-pair-wise probabilities, and Z is a normalization constant.

Accordingly, the probability Pr(Y) over all the labels is factorized to the product of several probabilities $Pr(YC_i)$ with each corresponding to a chunklet Ci. The optimization algorithm is performed over each chunklet, respectively, which further speeds up the inference.

From block 210, if the conditional probability is too small, and not applicable, the conditional probability score is not ranked as part of the video concept. Then the process takes a No branch to 212, where the score is not ordered for the video evaluation. This may occur when there is insufficient labeled data points, so the probabilities would need to be corrected.

Returning to block 210, if conditional probability is applicable, the process takes a Yes branch to block 214 to provide an ordered score. Block 214 represents an output for an ordered score for the transductive multi-label classification application program 106. The output is a concept score, which is a binary-value. For the video retrieval evaluation, an ordered score is often required to determine a rank. With these scores, the retrieved videos can be ranked. Thus, a probabilistic scoring scheme is presented from the discrete output. The score is evaluated as a conditional probability. Given the solution $Y^*$, the score of $y_{ic}=1$, i.e., the data point $x_i$ is associated with the label c, is evaluated as:

$$Pr(\mathbf{y}_{ic} = 1 | Y \backslash \mathbf{y}_{ic} = Y^* \backslash \mathbf{y}_{ic}) =$$
$$Pr(\mathbf{y}_{ic} = 1 | \mathbf{y}_{jc} = \mathbf{y}_{jc}^*, (i,j) \in \varepsilon_g^c, \mathbf{y}_{i\beta} = \mathbf{y}_{i\beta}^*, \beta \in C \backslash \{c\}) =$$
$$\frac{1}{Z} \prod_{(i,j) \in \varepsilon_S^c} \psi^\lambda(\mathbf{y}_{ic} = 1, \mathbf{y}_{jc} = \mathbf{y}_{jc}^*) \prod_{\beta \in C \backslash \{c\}} \psi^{1-\lambda}(\mathbf{y}_{ic} = 1, \mathbf{y}_{i\beta} = \mathbf{y}_{i\beta}^*),$$

where Z is a normalization constant, and $Y \backslash \mathbf{y}_{ic}$ is all the entries in Y except the entry $\mathbf{y}_{ic}$.

Illustrative Transductive Multi-Label Classification

Figure 3:
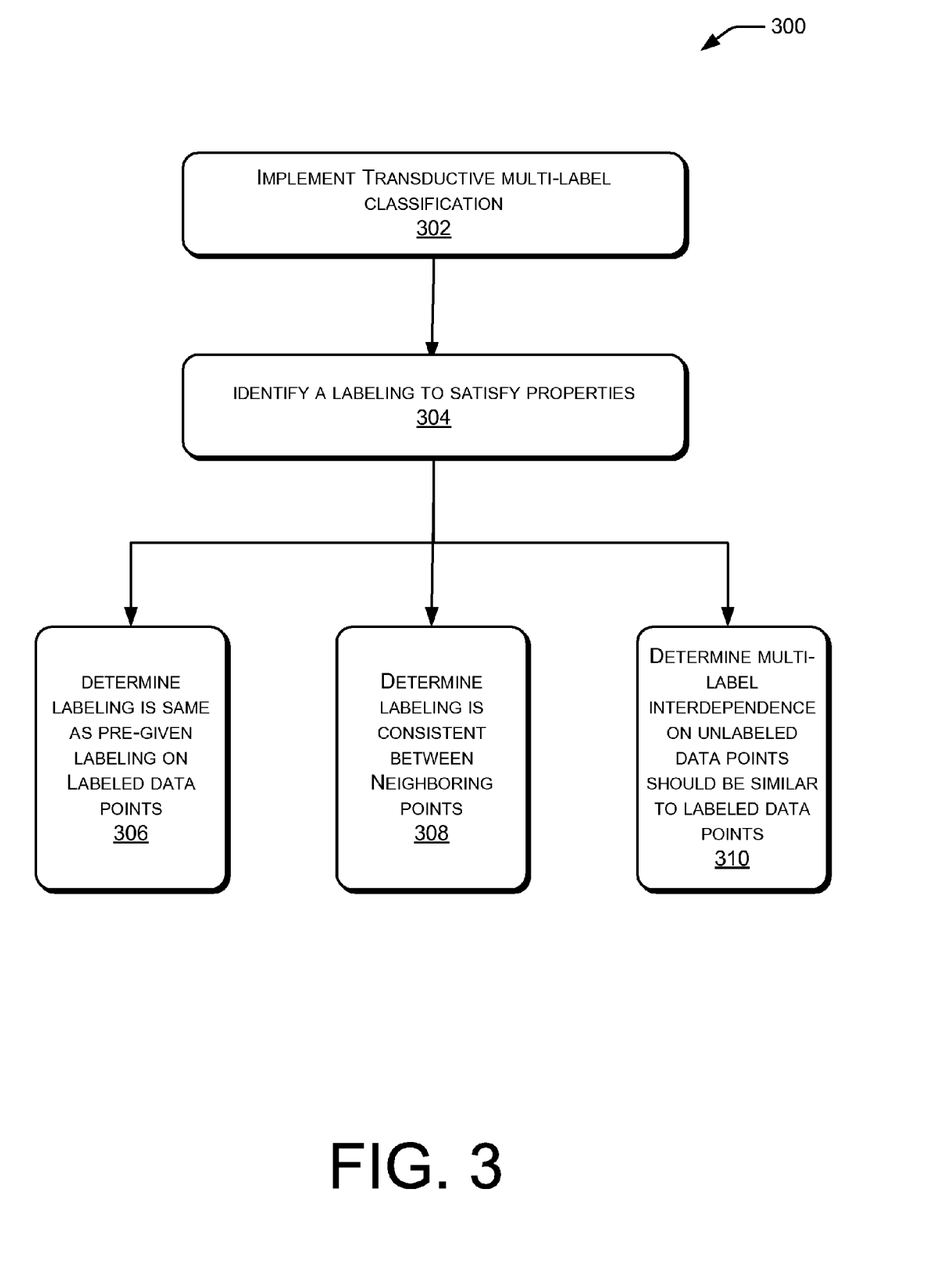
FIG. 3 is a flowchart identifying desired properties for the exemplary transductive multi-label classification approach of FIG. 1.
Figure 4:
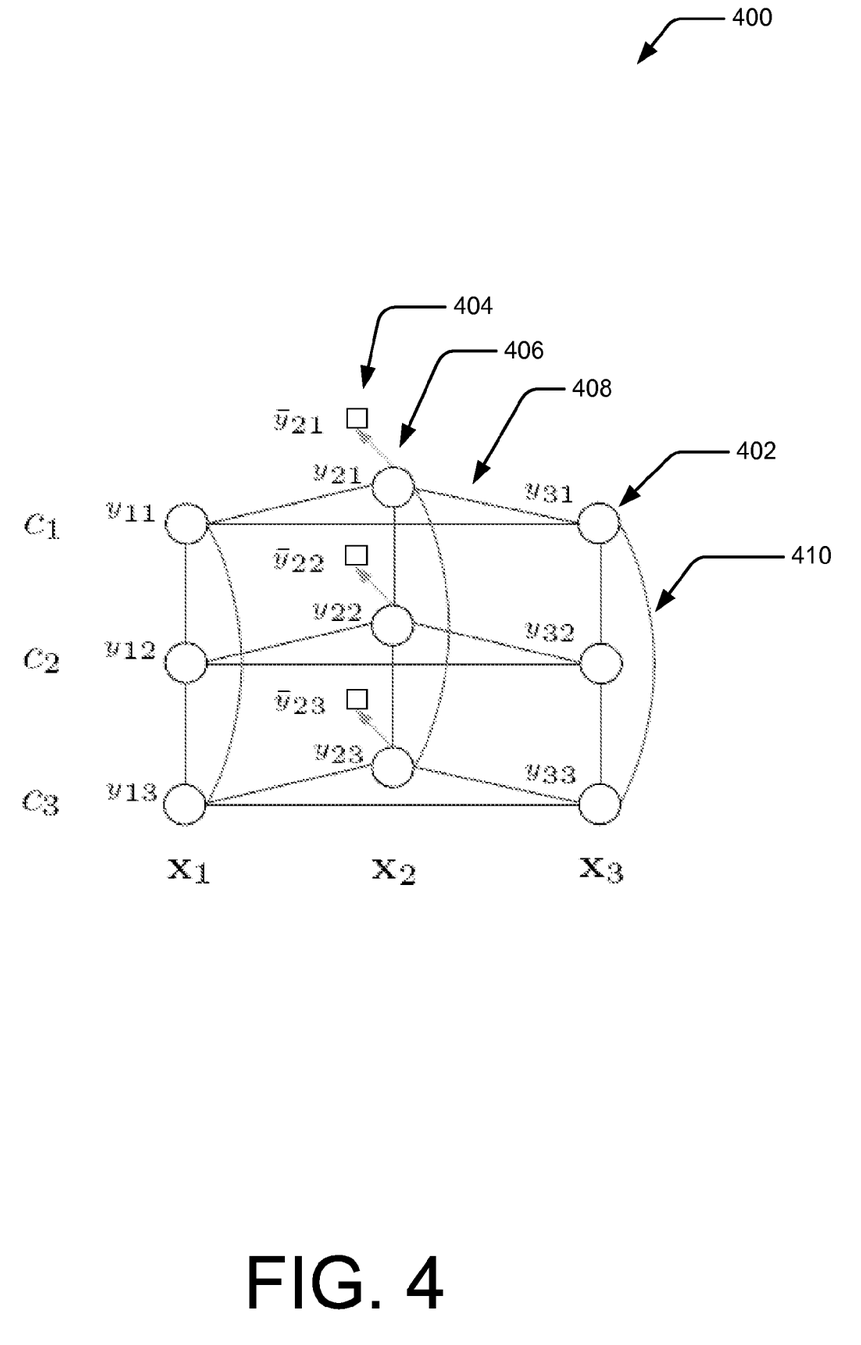
FIG. 4 is a block diagram of an exemplary graph for transductive multi-label classification for detecting concepts in videos.

FIGS. 3 and 4 illustrate an exemplary approach and an exemplary graph, respectively, for transductive multi-label classification application program 106. FIG. 3 is a flowchart showing an exemplary process of identifying the labeling for the exemplary transductive multi-label classification approach 300 of FIG. 1.

Shown in block 302 is implementing the transductive multi-label classification application program 106. In this implementation, the process may use n data points, $\chi = \{x_i\}_{i \in N}$, $N = \{1, \ldots, n\}$, and l points, $\{x_i\}_{i \in \mathcal{L}}$ are assigned with K-dimensional binary-valued label vectors $\{\bar{y}_i\}_{i \in \mathcal{L}}$, $\bar{y}_i \in \{0,1\}^K \mathcal{L} = \{1, \ldots, l\}$. Here, K is the cardinality of the label set $C = \{c_1, \ldots, c_K\}$. $\bar{y}_{ic} = 1$ indicates that $x_i$ is associated with the concept c, and is not associated with it otherwise. The task is to find label vectors $\{y_i\}_{i \in u}$ for the remaining points $\{x_i\}_{i \in u}$, $u = \{l+1, \ldots, n\}$. Denote $u = n - 1$ as the number of unlabeled points, $Y = [y_1 \ldots y_n]^T$ a label matrix of size n×k, and $y^c = Y(:,c)$ represents the c-th column vector and corresponds to a labeling configuration with respect to the concept c. $\bar{Y}_l$ and $Y_u$, correspond to the labeling over the labeled and unlabeled data, respectively. It should be noted that there may be more than 1 entries valued by 1 for $y_i$ in the multi-label case, while there is only one entry valued by 1 in the multi-class case.

Block 304 represents identifying a labeling to satisfy three properties, the three properties are described below in blocks 306, 308, and 310. As mentioned previously, the discrete hidden Markov random field formulation is used, which integrates the three properties into a single framework and makes it natural to introduce and model the multi-label interdependence.

Block 306 represents determining whether the labeling is the same as the pre-given labeling on the labeled data points. The labeling should satisfy this property of having a similar pre-given labeling as the labeled data points.

Block 308 represents determining whether there is a labeling consistency between the neighboring points. In this instance, the labeling consistency should be smooth.

Block 310 represents determining whether the multi-label interdependence on the unlabeled data points is similar to that on the labeled data points. The multi-label interdependence is a discrete formulation, which is more natural as the target value in classification is discrete. This last property gives an advantage for transductive multi-label classification 106.

Exemplary Graph for Transductive Multi-Label Classification

FIG. 4 is a block diagram of an exemplary graph 400 for transductive multi-label classification for detecting concepts in videos. The discrete hidden Markov random field (dH-MRF) formulation integrates the multi-label interdependence into a single framework as shown by the graph 400.

Shown at 402 is a circle representing a hidden variable, which represents a binary-valued label corresponding to an associated sample and concept. The hidden variable or node is constructed for each entry and denoted by $Y_{11}, Y_{12} \ldots Y_{nn}$ for simplicity. The set of hidden nodes may be denoted as $V_H$ to be shown later in an equation.

Shown at 404 is a square representing an observable variable, which is a pre-given binary-valued label over the labeled data point. An observable node is associated with each labeled data point, and denoted as $\bar{y}_{21}$. The set of observable nodes may be denoted as $V_o$ to be shown later in an equation.

Shown at 406 is a first set of edges, which connects the observable nodes and their corresponding hidden nodes. The first set of edges, known as the observable edges are shown as connecting ($\mathcal{Y}_{21}, \bar{y}_{21}$). The first set of edges 406 depicts the compatibility between the pre-given and predicting labeling over the labeled data point. This is assuming X2 is labeled data point.

Shown at 408 is a second set of edges, which connects neighboring data points ($\mathcal{Y}_{11}, \mathcal{Y}_{21}$), if their corresponding data points $Y_{11}$ and $Y_{21}$ are neighboring points. This second set of edges, known as sample-pair-wise edges, represents the labeling consistency between the neighboring data points.

Shown at 410 is a third set of edges, which connect a pair of nodes ($y_{31}, y_{33}$), corresponding to the same data point. The third set of edges is referred to as the label-pair-wise edges.

As shown in the graph, a hidden node is constructed for each entry. To illustrate the graph for equation purposes, there is a hidden node for each entry and is denoted by $y_{ic}$ for simplicity. The set of hidden nodes is denoted as $V_h$. The observable node is associated with each labeled data point, and denoted as $\bar{y}_{ic}$, for equation purposes. The set of observable nodes is denoted as $V_o$.

The observable nodes and their corresponding hidden nodes are connected to construct a first set of edges, referred to as the observable edges and denoted as $\epsilon_o = \{(y_{ic}, \bar{y}_{ic})\}_{i \in \mathcal{L}, c \in C}$. These edges are shown as 406 in FIG. 4.

Next are the second set of edges, referred to as the sample-pair-wise edge by connecting $y_{ic}$ and $y_{jc}$ for c∈C if their corresponding data points $x_i$ and $x_j$ are neighboring points. This second set of edges denoted as $\epsilon_s = \{(\mathcal{Y}_{ic}, \mathcal{Y}_{jc})\}_{i,j \in \mathcal{L}_{\cup u}, c \in C}$. These edges are shown as 408 in FIG. 4. Particularly, a third set of edges are connected on all the node pairs, ($\mathcal{Y}_{i\alpha}, \mathcal{Y}_{i\beta}$). Intuitively, the third set of edges connect the pair of nodes corresponding to the same data point. This third set of edges is denoted as $\epsilon_d = \{(\mathcal{Y}_{i\alpha}, \mathcal{Y}_{i\beta})\}_{i \in u, \alpha, \beta \in C}$ and referred to as label-pair-wise edges. These edges are shown as 410 in FIG. 4.

In summary, the constructed graph, $G = \{v, \epsilon\}$, is composed of a node set, $v = v_h \cup v_o$, and an edge set, $\epsilon = \epsilon_o \cup \epsilon_s \cup \epsilon_d$. Here, $\epsilon_o = \cup_{c \in C} \epsilon_o^c$ is a union of K subsets $\epsilon_o^c$, where each subset is a set of observable edges associated with the concept c. Similarly, $\epsilon_s = \cup_{c \in C} \epsilon_s^c$: and $\epsilon_d = \cup_{i \in u} \epsilon_d^i$ with $\epsilon_d^i$ being the set of label-pair-wise edges over the data point $x_i$.

Illustrative Mathematical Equations for Transductive Multi-Label Classification In the following, the potential functions over all the edges on the discrete hidden Markov random field are mathematically defined in equations. Considering the observable edge ($y_{ic}, \bar{y}_{ic}$) depicted as 406 in FIG. 4, a probability is defined between the two variables to describe their compatibility. The formulation assumes the pre-labeling is reliable and then defines a discrete probability over the hidden variable $y_{ic}$, which is shown in the equation below as:

$$Pr(y_{ic}) = \delta[y_{ic} = \bar{y}_{ic}],$$

where $\delta[\bullet]$ is an indicator function. This means that $y_{ic}$ must be valued as $\bar{y}_{ic}$ and the probability is zero otherwise. This is essentially equivalent to a Boltzmann distribution based on the energy function, $e_{i,c}(\mathcal{Y}_{ic}) = \theta_{i,c} \delta[\mathcal{Y}_{ic} \neq \bar{y}_{jc}]$.

where $\theta_{i,c}$ corresponds to a penalty that $y_{ic}$ is not equal to $\bar{y}_{ic}$. Here it is valued as ∞ since the pre-labeling over the labeled data points is expected to be unchangeable. Pr(yic) in the equation above can be equivalently evaluated as the Boltzmann distribution, shown in the equation below as:

$$Pr(y_{ic}) = \frac{\exp(-e_{i,c}(\mathcal{Y}_{ic}))}{\exp(-e_{i,c}(0)) + \exp(-e_{i,c}(1))}.$$

Therefore, the joint compatibility is the product of the compatibilities over all the observable edges, shown in the equation below as:

$$Pr_o(Y_i) = \Pi_{i \in \mathcal{L}, c \in C} Pr(y_{ic}),$$

which is essentially equivalent to the Boltzmann distribution of the loss function, shown in the equation as:

$$E_{loss} = \Sigma_{i \in \mathcal{L}, c \in C} e_{i,c}(\mathcal{Y}_{ic}) = \Sigma_{i \in \mathcal{L}, c \in C} \theta_{i,c} \delta[\mathcal{Y}_{ic} \neq \bar{y}_{jc}]$$

Regarding the second property, determining whether the labeling is consistent between neighboring points 308, it is expected that the labeling is consistent between the data points with similar features. The smoothness is factored between two label vectors into an aggregation of the smoothness between all the pairs of corresponding entries. Specifically, this is formulated as:

$$\psi(y_i, y_j) = \Pi_{c \in C} \psi(\mathcal{Y}_{ic}, \mathcal{Y}_{jc}).$$

The potential function over $y_{ic}$ and Yjc is defined in the equation below as:

$$\psi(\mathcal{Y}_{ic}, \mathcal{Y}_{jc}) = \Sigma_{p,q \in \{0,1\}} P_{ij,c}^{pq} \delta[\mathcal{Y}_{ic} = p \,\mathcal{Y}_{jc} = q],$$

where $\Sigma_{p,q \in \{0,1\}} P_{ij,c}^{pq} = 1$, and $P_{ij,c}^{pq}$ is the probability when $y_{ic}$=p and Yjc=q. The Boltzmann distribution of an Ising energy over an interacting pair is shown in the equation below as:

$$e_{ij,c}(\mathcal{Y}_{ic}, \mathcal{Y}_{jc}) = \theta_{ij,c}^0 \delta[\mathcal{Y}_{ic} \neq \mathcal{Y}_{jc}] + \theta_{ij,c}^1 \delta[\mathcal{Y}_{ic} = \mathcal{Y}_{jc}],$$

where $\theta_{ij,c}^1$ is a penalty that only one of xi and xj is assigned the label c, and $\theta_{ij,c}^1$ is a penalty that both xi and xj are assigned or not assigned the label c. In particular, two penalties are defined from two aspects: 1) preferable that the labeling is as smooth as possible, and 2) non-consistency between two points is proportional to the similarity. Therefore, $\theta_{ij,c}^1 = 0$ and $\theta_{ij,c}^0 = w_{ij}$, $w_{ij} = \exp(-\gamma \|x_i - x_j\|^2)$ with $\gamma > 0$ being a kernel parameter.

Combining all the potentials over the sample-pair-wise edges, the aggregated probability is formulated in an equation shown below as:

$$Pr_a(Y) = \frac{1}{Z_a} \prod_{(i,j) \in \epsilon_a} \psi(y_i, y_j)$$

$$= \frac{1}{Z_a} \prod_{(i,j) \in \epsilon_a^c, c \in C} \psi(\mathcal{Y}_{ic}, \mathcal{Y}_{jc}),$$

which is essentially as well the Boltzmann distribution of the regularization function as shown below:

$$E_{reg} = \Sigma_{c \in C} E_{reg,c} = \Sigma_{(i,j) \in \varepsilon_g^o, c \in C} \theta_{ij,c} \delta[\mathcal{Y}_{ic} \neq \mathcal{Y}_{jc}]$$

The pairwise interdependence between the multiple labels is evaluated, which is modeled as a pairwise Markov random field formulation. Specifically, the interdependence probability is defined as a product of the potential functions over all the pairs of labels for each data point, which is shown in the equation below as:

$$Pr(y_i) = 1/Z \Pi_{\alpha, \beta \in C} \phi(\mathcal{Y}_{i\alpha}, \mathcal{Y}_{i\beta})$$

where $\phi(\mathcal{Y}_{i\alpha}, \mathcal{Y}_{i\beta})$ is the interactive probability of the membership of the data point i with respect to two concepts α and β, $$\phi(\mathcal{Y}_{i\alpha}, \mathcal{Y}_{i\beta}) = \Sigma_{p,q \in \{0,1\}} P_{\alpha\beta}^{pq} \delta[\mathcal{Y}_{i\alpha} = p \land \mathcal{Y}_{i\beta} = q]$$

The label-pair-wise edges essentially bridge all the isolated subgraphs associated with the concepts and aggregate them into a single graph.

The functions over the label-pair-wise edges are different from the potential function estimation in the sample-pair-wise edges. Thus, the process learned the functions over the label-pair-wise edges from the labeled data points in the maximum likelihood criterion, i.e., maximizing criterion is shown in the equation below as:

$$\prod_{i \in \mathcal{L}} Pr(y_i) = \prod_{i \in \mathcal{L}, \alpha, \beta \in c} \frac{1}{Z'} \phi(\mathcal{Y}_{i\alpha}, y_{i\beta}).$$

The estimation is NP-hard since the Markov random field is a loopy graph. Shown in this process is a fast and an effective estimation scheme by using the joint probability over a pair of labels to estimate the potential function, as shown in the equation below:

$$P_{\alpha\beta}^{pq} = \frac{1}{|\mathcal{C}|} \sum_{i \in \mathcal{L}} \delta[\mathcal{Y}_{i\alpha} = p \land \mathcal{Y}_{i\beta} = q],$$

where $p, q \in \{0,1\}$, and $\delta[\cdot]$ is an indicator function. In practice, to avoid too small a probability due to the insufficiency of the labeled data points, the probabilities are corrected. For example, correcting the probabilities as the following, $P_{\alpha\beta}^{pq} = P_{\alpha\beta}^{pq} + \epsilon$ where $\epsilon$ is a small constant that is valued by 100/n in experiments, and normalized so the summation is equal to 1. Then, all of the potentials over the label-pair-wise edges for the unlabeled data are joined together as shown in the equation below:

$$Pr_d(Y_u) = \prod_{i \in U} Pr(y_i) = \frac{1}{Z_d} \prod_{i \in U, \alpha, \beta \in c} \phi(\mathcal{Y}_{i\alpha}, \mathcal{Y}_{i\beta}),$$

where $Z_d$ is a normalization constant.

It is worth pointing out that the multi-label interdependence takes into account, all of the possible relationships between the concept pairs. As previously mentioned, the concept pairs include, but is not limited to a positive-positive relationship, a positive-negative relationship, a negative-positive relationship, and a negative-negative relationship. In this process, all of the relationships among the labels are explored in such a way that the co-positive and co-negative relationships, the cross-positive relationships, including the negative-positive and positive-negative relationships, are reasonably captured. For example, the concepts "airplane" and "sky" often co-exist while "explosion file" and "waterscape waterfront" seldom occur at the same time in previous techniques, but this process explores these possibilities.

As mentioned previously, block 210 represented calculating the overall probability. In particular the probability combines 1) a probability between the two variables to describe their compatibility, 2) an aggregated probability that the labeling is consistent between data points with similar features, and 3) the probability of the pairwise interdependence between the multiple labels. The probabilities are aggregated into a single probability equation shown as, $$Pr(Y) = \frac{1}{Z} Pr_o(Y_l) Pr_s^\lambda(Y) Pr_d^{1-\lambda}(Y_u) =$$

$$\frac{1}{Z} \prod_{i \in \mathcal{L}, c \in C} Pr(\mathcal{Y}_{ic}) \prod_{c \in C, (i,j) \in \varepsilon_g^c} \psi^\lambda(\mathcal{Y}_{ic}, \mathcal{Y}_{jc}) \prod_{i \in U, \alpha, \beta \in c} \phi^{1-\lambda}(\mathcal{Y}_{i\alpha}, \mathcal{Y}_{i\beta})$$

where λ is a trade-off variable to control a balance between the sample-pair-wise and label-pair-wise probabilities, and Z is a normalization constant.

The corresponding discrete hidden Markov random field is illustrated in FIG. 4. Here, the first term of the right-hand side of the equation corresponds to the compatibility between the hidden labels and the pre-labeling that is defined over the first set of edges. The second term of the equation corresponds to the label consistency between the data points with similar features that is defined over the second set of edges. The last term of the equation corresponds to the multi-label interdependence that is defined over the third set of edges. Thus, the solution to the proposed transductive multi-label classification is found as the joint maximum, $$Y^* = \arg\max_Y Pr(Y).$$

As previously mentioned, if conditional probability is applicable, the process provides an ordered score. Block 214 represented an output an ordered score for the transductive multi-label classification application program 106. The output is a concept score, which is a binary-value. For the video retrieval evaluation, an ordered score is often required to determine the rank. With these scores, the retrieved videos can be ranked. Thus, a probabilistic scoring scheme is presented from the discrete output. The score is evaluated as a conditional probability. Given the solution Y*, the score of $y_{ic} = 1$, i.e., the data point $x_i$ is associated with the label c, is evaluated as:

$$Pr\left(\mathcal{Y}_{ic} = 1 \mid Y \backslash \mathcal{Y}_{ic} = Y \backslash \mathcal{Y}_{ic}^*\right) =$$

$$Pr(\mathcal{Y}_{ic} = 1 \mid \mathcal{Y}_{jc} = \mathcal{Y}_{jc}^*, (i,j) \in \varepsilon_g^c, \mathcal{Y}_{i\beta} = \mathcal{Y}_{i\beta}^*, \beta \in C \backslash \{c\}) =$$

$$\frac{1}{Z} \prod_{(i,j) \in \varepsilon_s^c} \psi^\lambda(\mathcal{Y}_{ic} = 1, \mathcal{Y}_{jc} = \mathcal{Y}_{jc}^*) \prod_{\beta \in C \backslash \{c\}} \psi^{1-\lambda}(\mathcal{Y}_{ic} = 1, \mathcal{Y}_{i\beta} = \mathcal{Y}_{i\beta}^*),$$

where Z is a normalization constant, and $Y \backslash \mathcal{Y}_{ic}$ is all the entries in Y except the entry $\mathcal{Y}_{ic}$.

Illustrative Chunklet Analysis for Transductive Multi-Label Classification

Figure 5:
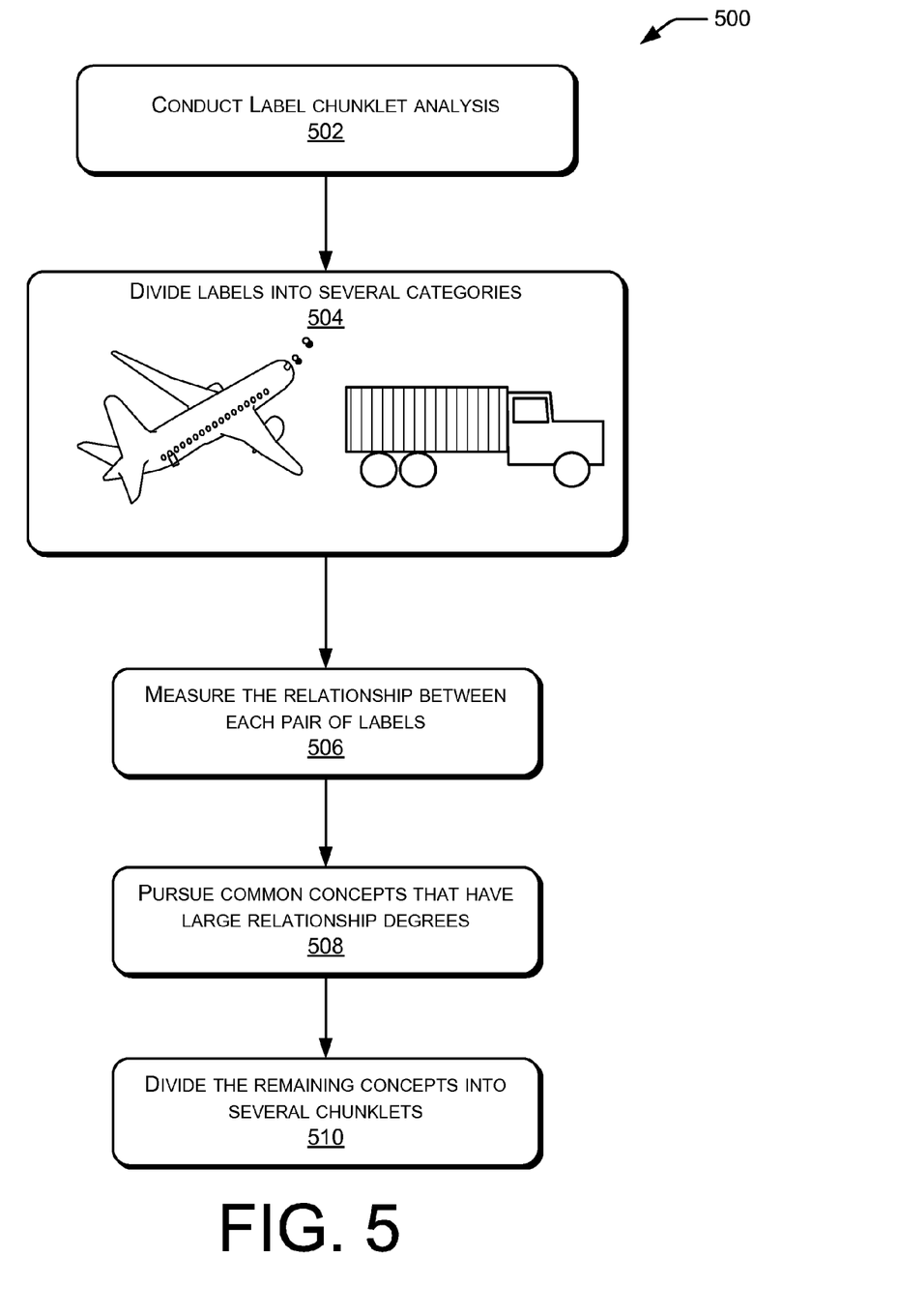
FIG. 5 is a flowchart showing an exemplary label chunklet analysis for detecting concepts in videos.

FIG. 5 is a flowchart showing an exemplary label chunklet analysis 500 for detecting concepts in videos. In block 502, label chunklet analysis for the multi-label interdependence is conducted. The chunklet extraction scheme includes three steps. The advantages are that the multiple labels are grouped into several parts to further speed up the labeling inference.

Block 504 illustrates how the labels can be divided to several categories such that the labels from different categories have smaller interdependence and the labels in the same category have larger interdependence. For example, in a data set, "airplane" and "truck" have strong mutual-dependence, but the two terms have less dependence with "weather". Therefore, the process categorizes the labels into several subsets, called label chunklets, which factorize the multi-label interdependence. Accordingly the probability Pr(Y) over all the labels in the Probability equation is factorized to the product of several probabilities $Pr(Y_{c_i})$ with each corresponding to a chunklet $C_i$. An optimization algorithm is performed over each chunklet, respectively, which further speed up the inference.

Block 506 represents measuring the relation between each pair of labels according to normalized mutual information (NMI). The normalized symmetric mutual information based on the geometric mean is selected because it is analogous to a normalized inner product. NMI is defined in the equation below as:

$$NMI(\alpha, \beta) = \frac{I(\alpha, \beta)}{\sqrt{H(\alpha)H(\beta)}}$$

where $I(\alpha, \beta)$ is the mutual information between the two labels, $\alpha$ and $\beta$, and $H(\alpha)$ is an entropy of $\alpha$.

Block 508 represents pursuing common concepts that have large relationship degrees with all the other concepts. The relationship degree for each concept is calculated as $d_\alpha = \Sigma_{c \in C} NMI(\alpha, c)$. According to ordered relation degrees for concepts, the items that are similar or corresponding, would be much larger than that of others. For example, concepts that are similar would be much larger in degrees than concepts that are not similar. Hence, the corresponding concepts, "face", "outdoor" and "person", are selected as common concepts would have large degrees.

Block 510 represents dividing the remaining concepts into several chunklets such that the relationship between different chunklets is smaller and the relationships within a chunklet is larger. The NMI between all the pairs over the different concepts may be shown in a chart. The NMI between the labels in the same chunklet of similar concepts would be much larger than the NMI between the labels from different chunklets from different concepts. A spectral clustering method may be adopted to solve this task and finally group into three chunklets.

Transductive Multi-Label Classification System

Figure 6:
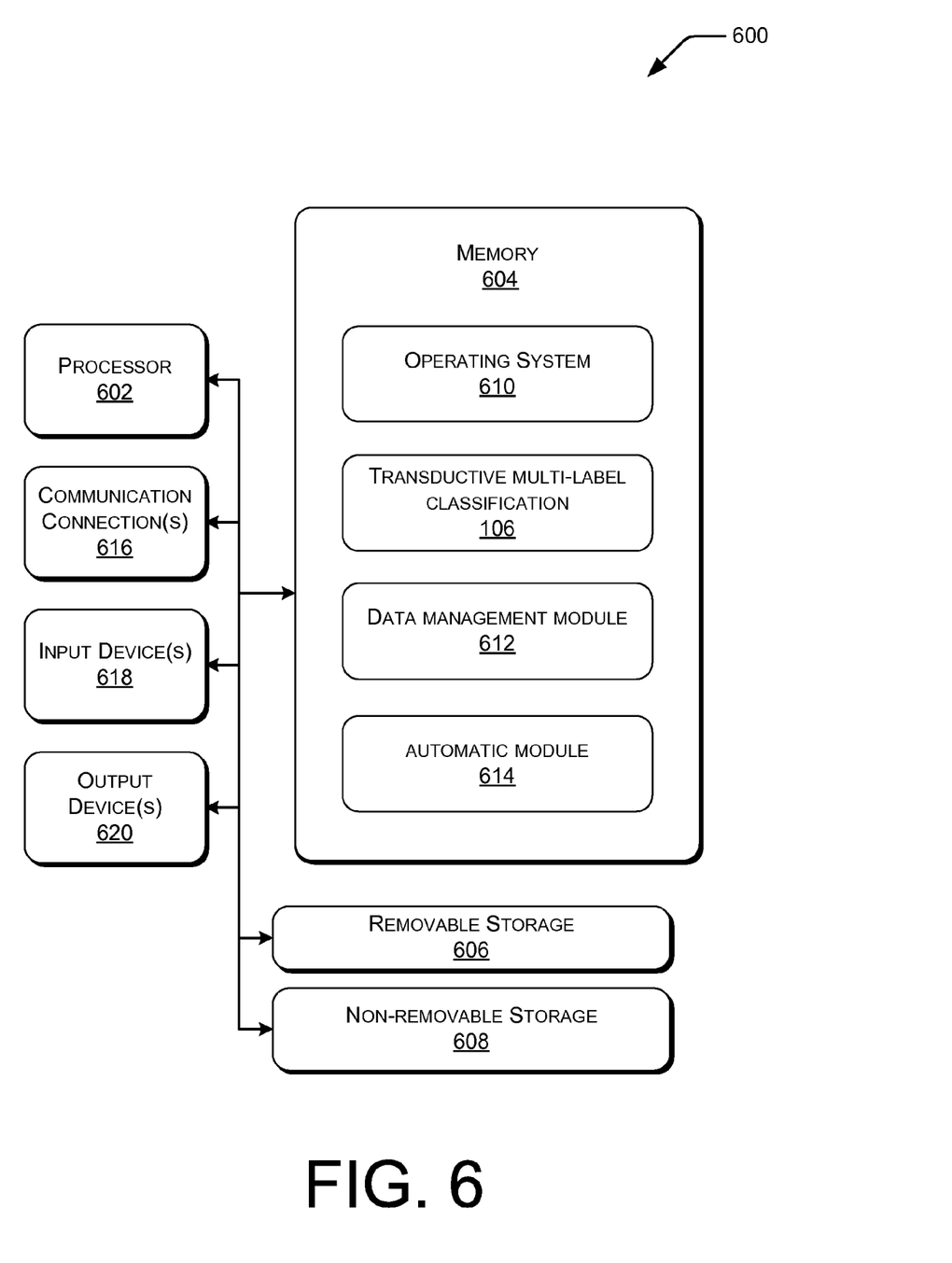
FIG. 6 is a block diagram showing details of an exemplary operating environment for implementing the transductive multi-label classification for video concept detection.

FIG. 6 is a schematic block diagram of an exemplary general operating system 600. The system 600 may be configured as any suitable system capable of implementing transductive multi-label classification application program 106. In one exemplary configuration, the system comprises at least one processor 602 and memory 604. The processing unit 602 may be implemented as appropriate in hardware, software, firmware, or combinations thereof. Software or firmware implementations of the processing unit 602 may include computer- or machine-executable instructions written in any suitable programming language to perform the various functions described.

Memory 604 may store programs of instructions that are loadable, embedded, or encoded, and executable on the processor 602, as well as data generated during the execution of these programs. Depending on the configuration and type of computing device, memory 604 may be volatile (such as RAM) and/or non-volatile (such as ROM, flash memory, etc.). The system may also include additional removable storage 606 and/or non-removable storage 608 including, but not limited to, magnetic storage, optical disks, and/or tape storage. The disk drives and their associated computer-readable medium may provide non-volatile storage of computer readable instructions, data structures, program modules, and other data for the communication devices.

Turning to the contents of the memory 604 in more detail, may include an operating system 610, one or more transductive multi-label classification application program 106 for implementing all or a part of transductive multi-label classification method. For example, the system 600 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 604 includes the transductive multi-label classification application program 106, a data management module 612, and an automatic module 614. The data management module 612 stores and manages storage of information, such as multi-labels, and the like, and may communicate with one or more local and/or remote databases or services. The automatic module 614 allows the process to operate without human intervention.

Memory 604, removable storage 606, and non-removable storage 608 are all examples of computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 600 may also contain communications connection(s) 616 that allow processor 602 to communicate with servers, the user terminals, and/or other devices on a network. Communications connection(s) 616 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 600 may also include input device(s) 618 such as a keyboard, mouse, pen, voice input device, touch input device, etc., and output device(s) 620, such as a display, speakers, printer, etc. The system 600 may include a database hosted on the processor 602. All these devices are well known in the art and need not be discussed at length here.

The subject matter described above can be implemented in hardware, or software, or in both hardware and software. Although embodiments of click-through log mining for ads have been described in language specific to structural features and/or methodological acts, it is to be understood that the subject matter defined in the appended claims is not necessarily limited to the specific features or acts described above.

Rather, the specific features and acts are disclosed as exemplary forms of exemplary implementations of click-through log mining for ads. For example, the methodological acts need not be performed in the order or combinations described herein, and may be performed in any combination of one or more acts.

The invention claimed is:

1. A method for a transductive multi-label classification, implemented at least in part by a computing device, the method comprising:
    utilizing a hidden Markov random field formulation to identify labels for concepts in a video content;
    modeling a multi-label interdependence between the labels by using a pairwise Markov random field, wherein combinations of pairwise relationships over the labels are seamlessly modeled into the hidden Markov random field formulation;
    grouping the labels into several parts to speed up a labeling inference; and
    calculating conditional probability scores for the labels, wherein the conditional probability scores are ordered for ranking in a video retrieval.

2. The method of claim 1, wherein the modeling comprises determining a compatibility between a label and a pre-given label on labeled data points.

3. The method of claim 1, wherein the modeling comprises determining whether a label consistency exists between neighboring data points that have similar type features.

4. The method of claim 1, wherein the modeling comprises determining whether a multi-label interdependence over unlabeled data points is similar to a multi-label interdependence over labeled data points.

5. The method of claim 1, wherein the grouping the labels into several parts to speed up a labeling inference comprises using a label chunklet analysis to categorize the labels into several subsets.

6. The method of claim 5, wherein the label chunklet analysis further comprises:
    measuring a relationship between each pair of labels;
    pursuing common concepts that have large relationship degrees with other concepts; and
    dividing remaining concepts into several chunklets, wherein a relationship between chunklets that are different is smaller and a relationship within a chunklet is larger.

7. The method of claim 1, further comprising using an optimization algorithm to infer the labels by combining:
    a tree-reweighted message passing, which is an iterative statistical inference algorithm; and
    graph cuts, which estimate an intermediate inductive decision function.

8. The method of claim 1, further comprising determining the multi-label interdependence between the labels by using concept pairs.

9. The method of claim 1, further comprising integrating in a single formulation, relationships between pairs of labels, the relationships including at least one of: a positive-positive relationship, a positive-negative relationship, a negative-positive relationship, or a negative-negative relationship.

10. The method of claim 1, wherein the calculating the conditional probability scores for the labels comprises calculating:
    a probability between two variables to describe a compatibility;
    an aggregated probability that the labeling is consistent between data points with similar features; or
    a probability of the pairwise interdependence between the labels.

11. A computing device storage media storing computer-readable instructions that, when executed, perform acts comprising:
    detecting concepts in a video content by using a hidden Markov random field formulation to identify labels for the concepts in the video content;
    determining a transductive multi-label classification by finding the labels that are similar as pre-given labels on labeled data points;
    determining the labels are consistent between neighboring points;
    determining a multi-label interdependence on unlabeled data points is similar to a multi-label interdependence on the labeled data points;
    conducting a chunklet analysis for the multi-label interdependence on the unlabeled data points and the multi-label interdependence on the labeled data points; and
    retrieving a video based on an ordered score from the transductive multi-label classification.

12. The computing device storage media of claim 11, further comprising an act of integrating in a single formulation, relationships between pairs of labels, the relationships including at least one of: a positive-positive relationship, a positive-negative relationship, a negative-positive relationship, or a negative-negative relationship.

13. The computing device storage media of claim 11, wherein the chunklet analysis include acts to:
    measure a relationship between each pair of labels according to a normalized mutual information (NMI); and
    pursue common concepts that have large relationship degrees with other concepts.

14. The computing device storage media of claim 11, further comprising an act of calculating conditional probability scores for the labels, wherein the conditional probability scores are ordered for ranking in a video retrieval.

15. A method for a transductive multi-label classification, implemented at least in part by a computing device, the method comprising:
    detecting concepts in a video content by using a hidden Markov random field formulation to identify labels for the concepts by:
        determining the transductive multi-label classification by measuring similarity scores based on the labels and pre-given labels on labeled data points;
        determining the labels are consistent between neighboring points;
        determining a multi-label interdependence on unlabeled data points is similar to a multi-label interdependence on the labeled data points; and
        analyzing the concepts for the multi-label interdependence on the unlabeled data points and the multi-label interdependence on the labeled data points by using chunklet analysis.

16. The method of claim 15, further comprising constructing a graph with:
    a set of hidden nodes to represent binary-valued labels;
    a set of observable nodes to represent pre-given binary-valued labels;
    a first set of edges to connect the set of hidden nodes and the set of observable nodes, wherein the first set of edges represents observable edges;
    a second set of edges to connect the hidden nodes; and
    a third set of edges to connect a pair of nodes.

17. The method of claim 16, wherein:
the set of hidden nodes represents the binary-valued labels that correspond to associated concepts;
the set of observable nodes represents the pre-given binary-valued labels that are over the labeled data points;
the first set of edges represents a compatibility between the set of hidden nodes representing the binary-valued labels that correspond to the associated concepts and the set of observable nodes representing the pre-given binary valued labels that are over the labeled data points;
the second set of edges represents a labeling consistency between the neighboring data points for visually similar videos, if corresponding data points are the neighboring data points; and
the third set of edges models the multi-label interdependence on the unlabeled data points and the multi-label interdependence on the labeled data points for each video.

18. The method of claim 15, wherein the chunklet analysis comprises actions to perform:
measuring a relationship between each pair of labels according to a normalized mutual information (NMI); and
pursuing common concepts that have large relationship degrees with other concepts.

19. The method of claim 15, further comprising calculating probability scores for the labels, wherein the probability scores are ordered for ranking in a video retrieval.

20. The method of claim 15, further comprising determining a multi-label interdependence between the labels on the labeled data points and on the unlabeled data points by analyzing relationships between concept pairs.

* * * * *